(12) United States Patent
Behlman et al.

(10) Patent No.: US 11,591,915 B2
(45) Date of Patent: Feb. 28, 2023

(54) MULTI-FLOW COOLING CIRCUIT FOR GAS TURBINE ENGINE FLOWPATH COMPONENT

(71) Applicant: United Technologies Corporation, Farmington, CT (US)

(72) Inventors: Renee Behlman, Colchester, CT (US); Tracy Propheter-Hinckley, Rocky Hill, CT (US); Raymond Surace, Newington, CT (US); Matthew Devore, Rocky Hill, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 350 days.

(21) Appl. No.: 16/587,684

(22) Filed: Sep. 30, 2019

(65) Prior Publication Data

US 2021/0095596 A1 Apr. 1, 2021

(51) Int. Cl.
| | |
|---|---|
| *F01D 5/18* | (2006.01) |
| *F01D 9/06* | (2006.01) |
| *F01D 17/16* | (2006.01) |
| *F01D 25/12* | (2006.01) |
| *F02C 9/22* | (2006.01) |
| *F04D 29/56* | (2006.01) |
| *F04D 29/58* | (2006.01) |

(52) U.S. Cl.
CPC ............ *F01D 5/187* (2013.01); *F01D 5/186* (2013.01); *F01D 5/188* (2013.01); *F01D 9/065* (2013.01); *F01D 17/162* (2013.01); *F01D 25/12* (2013.01); *F02C 9/22* (2013.01); *F04D 29/563* (2013.01); *F04D 29/5846* (2013.01); *F05D 2260/202* (2013.01)

(58) Field of Classification Search
CPC ....................................................... F02C 9/22
See application file for complete search history.

(56) References Cited

U.S. PATENT DOCUMENTS

| | | | | |
|---|---|---|---|---|
| 4,798,515 A | * | 1/1989 | Hsia | F01D 17/162 415/115 |
| 6,612,114 B1 | * | 9/2003 | Klingels | F01D 5/187 60/785 |
| 2002/0150470 A1 | * | 10/2002 | Tiemann | F01D 25/12 415/115 |

(Continued)

FOREIGN PATENT DOCUMENTS

EP 3498979 6/2019

OTHER PUBLICATIONS

European Search Report for Application No. 20196540.7 dated Feb. 2, 2021.

*Primary Examiner* — Todd E Manahan
*Assistant Examiner* — Alyson Joan Harrington
(74) *Attorney, Agent, or Firm* — Carlson, Gaskey & Olds, P.C.

(57) ABSTRACT

A flowpath component for a gas turbine engine includes a body having a leading edge and a trailing edge. A first exterior wall connects the leading edge to the trailing edge and a second exterior wall connects the leading edge to the trailing edge. At least one first internal cooling passage has a first inlet at a first end of the body. At least one second internal cooling passage has a second inlet at a second end of the body. The at least one first internal cooling passage is isolated from the at least one second internal cooling passage.

16 Claims, 4 Drawing Sheets

(56) References Cited

U.S. PATENT DOCUMENTS

| | | | |
|---|---|---|---|
| 2010/0247293 A1* | 9/2010 | McCaffrey | F01D 17/162 |
| | | | 415/160 |
| 2013/0098050 A1* | 4/2013 | Kupratis | F02K 3/077 |
| | | | 60/772 |
| 2016/0061112 A1 | 3/2016 | Hagan | |
| 2016/0251974 A1* | 9/2016 | Slavens | F01D 5/189 |
| | | | 60/806 |
| 2016/0290158 A1 | 10/2016 | Slavens et al. | |
| 2017/0248021 A1 | 8/2017 | Auxier | |
| 2017/0328379 A1 | 11/2017 | Scholtes et al. | |
| 2018/0135420 A1* | 5/2018 | Surace | F04D 29/582 |
| 2018/0135431 A1* | 5/2018 | Propheter-Hinckley | |
| | | | F01D 5/147 |
| 2018/0135459 A1 | 5/2018 | Propheter-Hinckley | |
| 2019/0323432 A1* | 10/2019 | Aoyama | F01D 5/085 |

* cited by examiner

MULTI-FLOW COOLING CIRCUIT FOR GAS TURBINE ENGINE FLOWPATH COMPONENT

GOVERNMENT RIGHTS

This invention was made with Government support under Contract No. N00014-09-D-0821-0006 awarded by the United States Navy. The Government has certain rights in this invention.

TECHNICAL FIELD

The present disclosure relates generally to cooling circuits for a gas turbine engine flowpath component.

BACKGROUND

Gas turbine engines, such as those utilized in commercial and military aircraft, include a compressor section that compresses air, a combustor section in which the compressed air is mixed with a fuel and ignited, and a turbine section through which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Some gas turbine engines include multiple compressor and turbine stages, each of which is defined by a pairing of flow directing rotors and vanes. In certain examples, one or more of the flowpath components within the stage can include cooling passages that expel air along the surface of the flowpath component to create a film cooling effect. Cooling air in such examples is typically provided from a flow inlet at a single end of the flowpath component.

SUMMARY OF THE INVENTION

An exemplary flowpath component for a gas turbine engine includes a body having a leading edge and a trailing edge, a first exterior wall connecting the leading edge to the trailing edge and a second exterior wall connecting the leading edge to the trailing edge; at least one first internal cooling passage having a first inlet at a first end of the body; at least one second internal cooling passage having a second inlet at a second end of the body; and wherein the at least one first internal cooling passage is isolated from the at least one second internal cooling passage.

In another example of the above described exemplary flowpath component, the body is a variable vane having a first angle of attack in a first vane position and a second angle of attack in a second vane position.

In another example of any of the above described exemplary flowpath components, the body has an airfoil profile and is configured to have a first angle of attack in a first position and a second angle of attack in a second position.

In another example of any of the above described exemplary flowpath components, the first end of the body is a radially outward end relative to an engine in which the flowpath component is incorporated.

In another example of any of the above described exemplary flowpath components, the second end of the body is a radially inward end opposite the first end.

In another example, the above described exemplary flowpath components includes a plurality of cooling film holes connecting the at least one second internal cooling passage to an exterior edge of the flowpath body.

In another example of any of the above described exemplary flowpath components, at least a portion of the at least one second internal cooling passage extends to the leading edge.

In another example of any of the above described exemplary flowpath components, the flowpath body is a first stage turbine vane.

In another example of any of the above described exemplary flowpath components, the flowpath body is a second or later stage turbine vane.

In another example of any of the above described exemplary flowpath components, the second inlet is connected to a feed through passage in an adjacent rotor hub.

An exemplary gas turbine engine includes a compressor section having a plurality of compressor stages, each compressor stage in the plurality of compressor stages including a set of compressor rotors and a set of compressor vanes; a combustor section fluidly connected to the compressor section and including a combustor; a turbine section fluidly connected to the combustor section and including a plurality of turbine stages, each of the turbine stages in the plurality of turbine stages including a set of rotors and a set of turbine vanes; wherein at least one of the set of compressor vanes and the set of turbine vanes comprises a set of variable vanes each vane in the set of variable vanes having a body having a leading edge and a trailing edge, a first exterior wall connecting the leading edge to the trailing edge and a second exterior wall connecting the leading edge to the trailing edge, at least one first internal cooling passage having a first inlet at a first end of the body, at least one second internal cooling passage having a second inlet at a second end of the body, and wherein the at least one first internal cooling passage is isolated from the at least one second internal cooling passage.

In another example of any of the above described gas turbine engine, the body has an airfoil profile and is configured to have a first angle of attack in a first position and a second angle of attack in a second position.

In another example of any of the above described gas turbine engines, the first end of the body is a radially outward end relative to a radius of the engine and the second end of the body is a radially inward end opposite the first end.

In another example of any of the above described gas turbine engines, the set of variable vanes is a subset of vanes in a single stage, and wherein the set of variable vanes are alternated with a set of fixed vanes within the stage.

In another example of any of the above described gas turbine engines, the first inlet is disposed within a spindle.

In another example, any of the above gas turbine engines also includes a plurality of cooling film holes connecting the at least one second internal cooling passage to an exterior edge of the body.

In another example of any of the above described gas turbine engines, at least a portion of the at least one second internal cooling passage extends to the leading edge.

In another example of any of the above described gas turbine engines, the second inlet is connected to a feed through passage in an adjacent rotor hub.

An example method for cooling a variable vane includes providing a first cooling flow to a first set of internal cooling passages from a first cooling flow inlet; and providing a second cooling flow to a second set of internal cooling passages from a second cooling flow inlet, the second set of internal cooling passages being isolated from the first set of internal cooling passages.

Another example of the above method includes providing the first cooling flow to the first set of internal cooling passages comprises providing the first cooling flow through a radially outward spindle of the variable vane, wherein providing the second cooling flow to the second set of internal cooling passages comprises providing the second cooling flow through a radially inward spindle of the variable vane, and wherein the method further includes cooling a leading edge of the variable vane and a pressure side of the variable vane using the first cooling flow and cooling a trailing edge and the suction side of the variable vane using the second cooling flow.

These and other features of the present invention can be best understood from the following specification and drawings, the following of which is a brief description.

DETAILED DESCRIPTION

Figure 1:
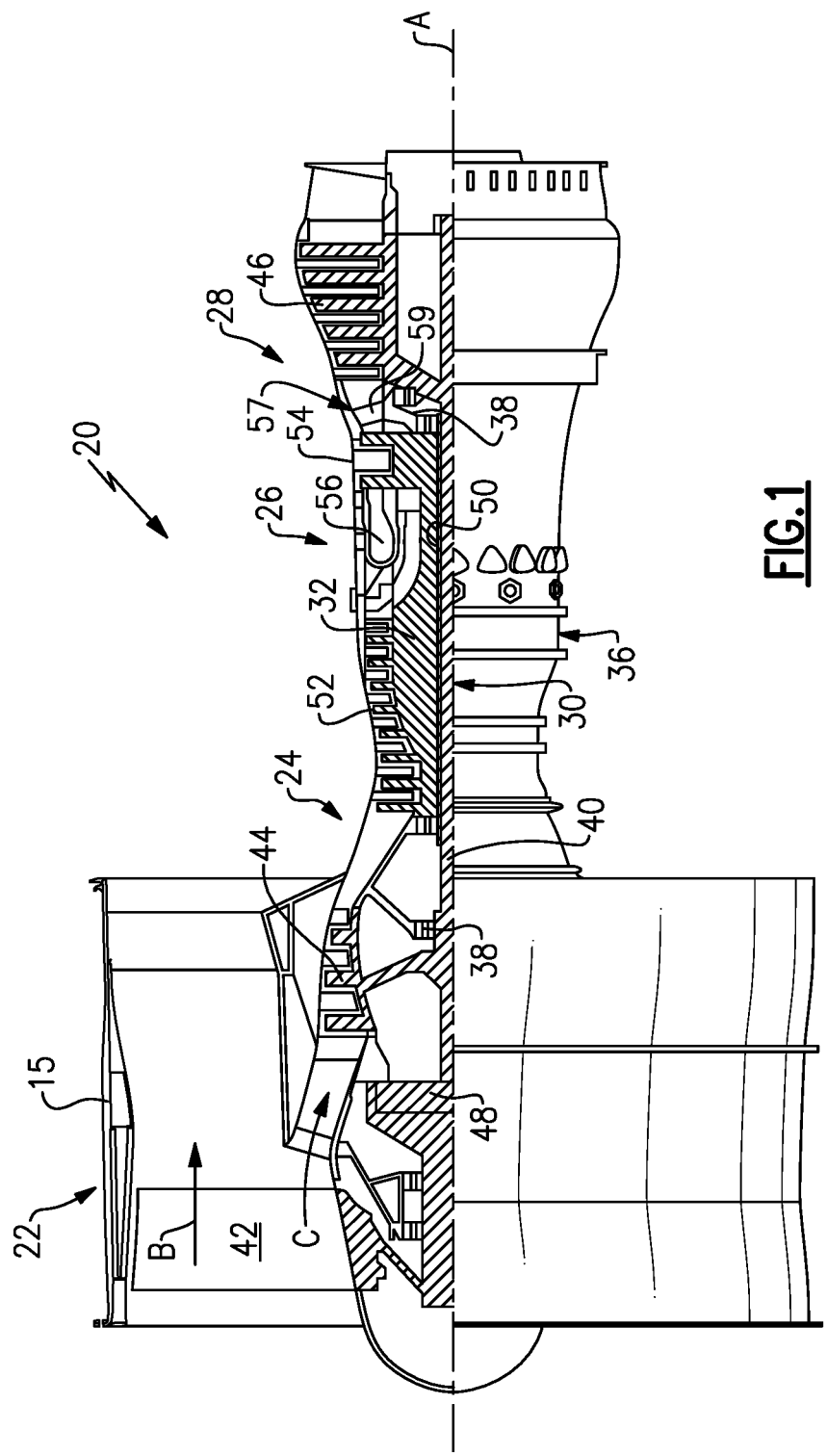
FIG. 1 illustrates a gas turbine engine according to one example.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures, turbofans with a direct driven fan, turbofans with a gear driven fan, and turbofans with multiple bypass flowpaths.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350.5 meters/second).

Within the turbine section 28 are multiple stages, each of which includes a set of rotors circumferentially disposed about an axis defined by the engine 20 and fixed to a corresponding rotating shaft. Each set of rotors is paired with a corresponding set of vanes, with the vanes being connected to an engine static structure. In some examples, such as the examples illustrated in FIGS. 2-6 and described below, the vanes in one or more stages can be configured to transition between two or more angles of attack, relative to airflow through the turbine section 28. Such vanes are referred to as variable vanes due to the ability to vary their angle of attack. In some examples a stage can include all variable vanes. In alternative examples, a single stage can include alternating fixed and variable vanes. In other examples, alternative fixed/variable vane configurations can be incorporated in a single stage.

Due to the extreme levels of heat that turbine sections are exposed to, many or all of the vanes can include internal cooling passages that distribute cooling air through the vanes. The cooling air is then dispersed to an exterior surface of the vane through holes connecting one or more of the passages to the exterior surface of the vane to create a film cooling effect that protects the exterior of the vane from the extreme heat. One factor that is considered in the design of vanes, and other flowpath components including film cooling, is the back flow margin.

To achieve the film cooling, pressure from the internal cooling passages to the external surface in the gaspath drives the cooler air from the internal passage through the film cooling passages in the wall of the flowpath component. The pressure ratio required to drive the air outward, rather than allow hot flowpath air into the flowpath component, is referred to as the backflow margin. When the flowpath components, such as the vanes, have variable angles of attack, altering the angle of attack alters the backflow margin of the film cooling holes, and the pressure of the air available to the film cooling holes from the internal cavities can limit the magnitude of variance in the angle of attack that can be efficiently achieved.

Figure 2:
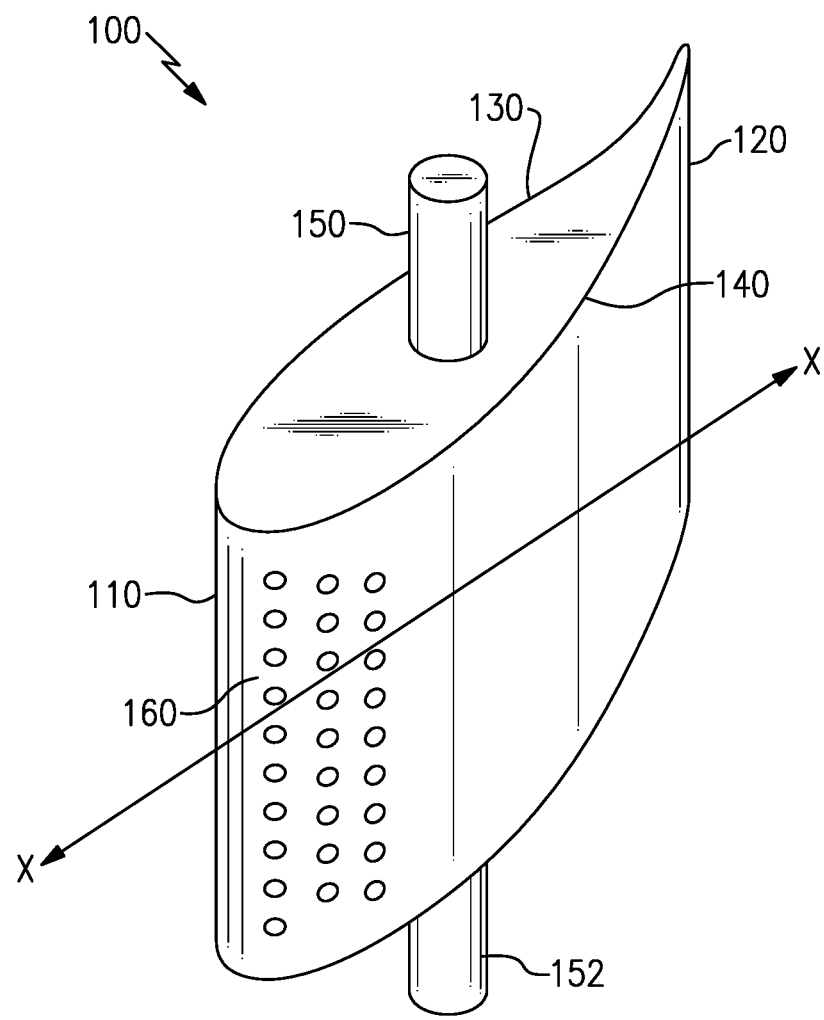
FIG. 2 schematically illustrates an isometric view of a variable vane in the gas turbine engine of FIG. 1.

With continued reference to FIG. 1, FIG. 2 schematically illustrates an exemplary variable vane 100. The variable vane 100 includes a leading edge 110 and a trailing edge 120, with the leading edge 110 being the forward most edge relative to an expected direction of airflow through the turbine section 28 of the engine 20. The leading edge 110 is connected to the trailing edge 120 via a pressure side 130 and a suction side 140, with the sides 130, 140 forming an airfoil profile of the variable vane 100. Protruding radially outward from an outer portion of the vane, relative to a radius of the engine 20, is a first spindle 150. Similarly, protruding radially inward from an inward portion of the vane 100 is a second spindle 152. Each of the spindles 150, 152 connect to an engine static structure and drive the position of the variable vane 100. During operation, when an engine controller determines that the angle of attack of the vane 100 should be altered, the spindles 150, 152 are rotated, which causes a corresponding rotation of the vane 100.

Included within the vane 100 are multiple internal cooling passages 170, 172 (illustrated in FIGS. 3A and 3B), with at least a portion of the internal cooling passages being connected to the pressure side 130 and the suction side 140 via corresponding film cooling holes 160. While only illustrated at the leading edge 110 area of the vane 100, it is appreciated that the film cooling holes 160 can be distributed across the pressure side and the suction side of the vane 100.

Figure 3A:
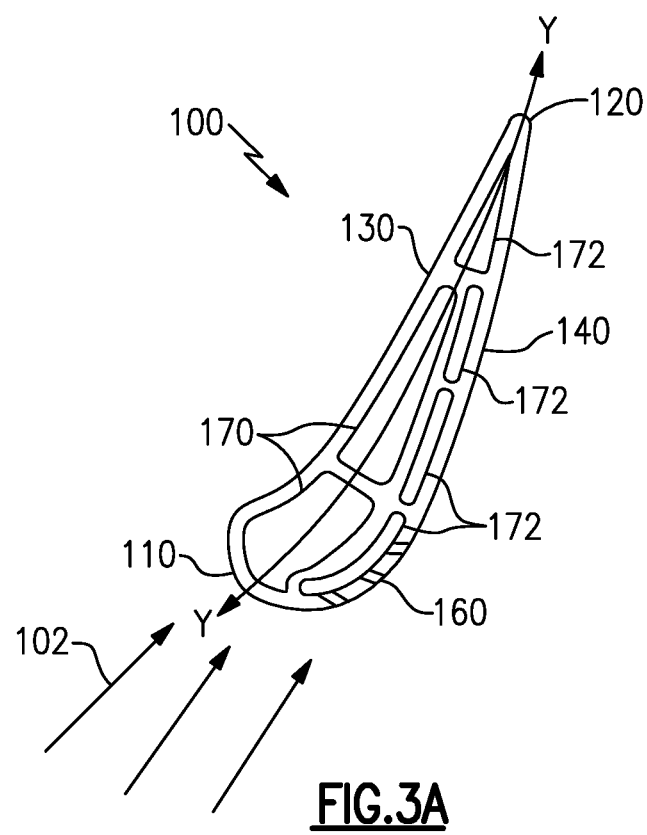
FIG. 3 schematically illustrates an axially aligned cross section of the variable vane of FIG. 2 in a first position (FIG. 3A) and a second position (FIG. 3B).
Figure 3B:
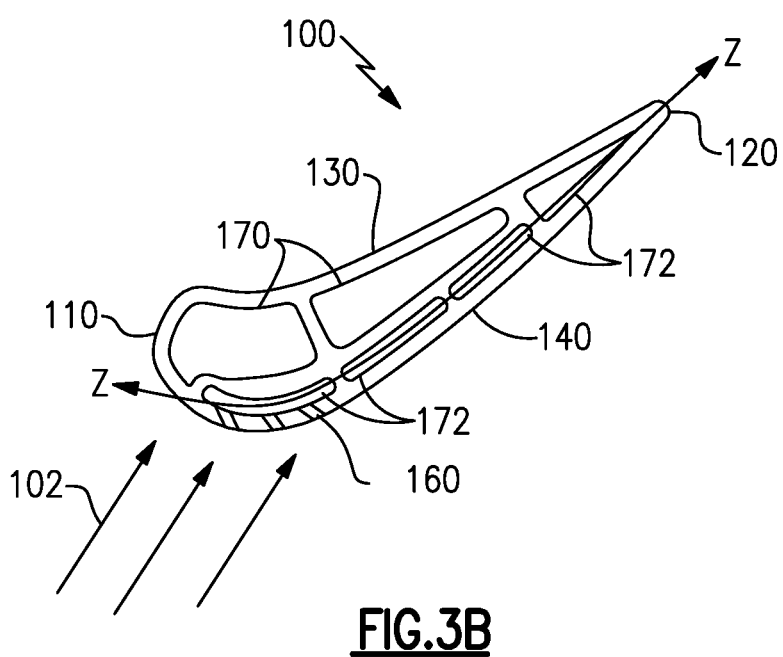

With continued reference to FIG. 2, FIG. 3 schematically illustrates a cross section of the vane 100 drawn along X-X in a first position (FIG. 3A) and a second position (FIG. 3B). Included is a first set of internal cooling passages 170, and a second set of internal cooling passages 172. At least one of the cooling passages 172 in the second set of cooling passages 172 is connected to the exterior surface of the vane 100 via the film cooling holes 160. While only illustrated as being connected to the forward most internal cooling passage 172 in the second set of cooling passages 172, it is appreciated that other internal cooling passages 170, 172 can be connected to the external surface via film cooling holes as well.

In the illustrated example of FIG. 3A, the vane 100 is angled directly toward an expected fluid flow 102 through the turbine section 28. Due to the angling of the vane 100, the outlet of the film cooling holes 160 are generally perpendicular to, or near perpendicular to the fluid flow 102, and a relatively low pressure margin is required in order to ensure that cooling air flows out of the film cooling holes 160, rather than turbine air flowing into the film cooling holes 160. However, when rotated (as shown in FIG. 3B), the outlets of the film cooling holes 160 are more aligned with the expected direction of fluid flow 102. As a result of the new alignment, the backflow margin in the second position is increased.

In order to provide sufficient backflow margin to the second set of cooling passages 172 to prevent backflow through the film cooling holes 160, the first set of cooling passages 170 and the second set of cooling passages 172 are isolated from each other and provided distinct cooling fluid feeds. In some examples, this construction is achieved via the use of two distinct casting cores during the casting process. In alternative examples, the separation of the first set of cooling passages 170 and the second set of cooling passages can be achieved in alternative manners.

Figure 4:
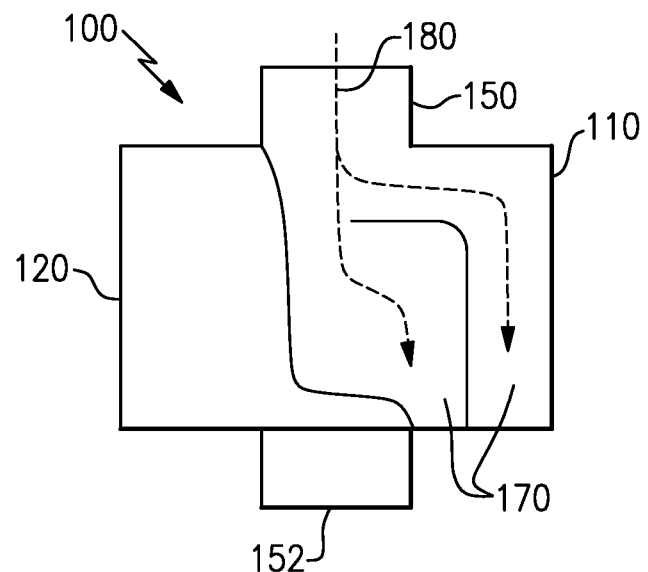
FIG. 4 Schematically illustrates a first radial cross sectional view of the exemplary vane of FIG. 2.
Figure 5:
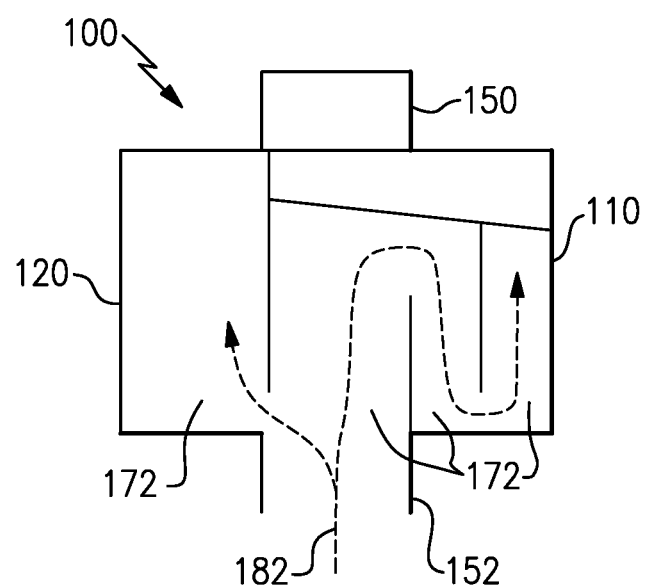
FIG. 5 schematically illustrates a second radial cross sectional view of the exemplary variable vane of FIG. 2.

With continued reference to FIGS. 3A and 3B, FIG. 4 schematically illustrates the vane 100 cut along cross section Y-Y (illustrated in FIG. 3A). Similarly, FIG. 5 schematically illustrates the vane 100 cut along cross section Z-Z (illustrated in FIG. 3B). In order to provide each set of internal cooling passages 170, 172 with the corresponding cooling air, 180, 182, air is provided through the spindles 150, 152, with the radially outward spindle 150 providing air 180 to the first set of cooling passages 170, and the radially inward spindle 152 providing cooling air to the second set of cooling passages 172. Put another way, the leading edge 110 and pressure side 130 are cooled via air from the radially outward spindle 180, and the trailing edge 120 and suction side 140 are cooled with air 182 provided through the radially inward spindle 152.

As the cooling air provided to the second set of cooling passages 172 is provided through the radially inward spindle or through an airfoil, the cooling air is first passed through the secondary flow stream of the turbine upstream of the vane 100. In examples where the vane 100 is the first stage of the turbine section, the cooling air can then be provided directly to the spindle 152. In examples where the vane 100 is the second or later stage of the turbine section 28, the air is piped around or passed through a rotor hub of a rotor adjacent to the vane 100 to provide the airflow 182 into the spindle 152, and thus into the internal cooling passages 172.

While described above with regards to the specific context of a variable turbine vane, one of skill in the art will appreciate that features of this disclosure can be incorporated into other flowpath components including fixed vanes and rotors with minimal modifications to the underlying structure.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A flowpath component for a gas turbine engine comprising:
a body having a leading edge and a trailing edge, a first exterior wall connecting the leading edge to the trailing edge and a second exterior wall connecting the leading edge to the trailing edge;
at least one first internal cooling passage having a first inlet at a first end of the body, and including at least a portion extending to the leading edge;
at least one second internal cooling passage having a second inlet at a second end of the body, and being connected to the leading edge of the flowpath body via a plurality of film cooling holes; and
wherein the at least one first internal cooling passage is isolated from the at least one second internal cooling passage.

2. The flowpath component of claim 1, wherein the body is a variable vane having a first angle of attack in a first vane position and a second angle of attack in a second vane position.

3. The flowpath component of claim 2, wherein the body has an airfoil profile and is configured to have a first angle of attack in a first position and a second angle of attack in a second position.

4. The flowpath component of claim 1, wherein the first end of the body is a radially outward end relative to an engine in which the flowpath component is incorporated.

5. The flowpath component of claim 4, wherein the second end of the body is a radially inward end opposite the first end.

6. The flowpath component of claim 1, wherein at least a portion of the at least one second internal cooling passage extends to the leading edge.

7. The flowpath component of claim 1, wherein the flowpath body is a first stage turbine vane.

8. The flowpath component of claim 1, wherein the flowpath body is a second or later stage turbine vane.

9. A gas turbine engine comprising:
a compressor section having a plurality of compressor stages, each compressor stage in the plurality of compressor stages including a set of compressor rotors and a set of compressor vanes;
a combustor section fluidly connected to the compressor section and including a combustor;
a turbine section fluidly connected to the combustor section and including a plurality of turbine stages, each of the turbine stages in the plurality of turbine stages including a set of rotors and a set of turbine vanes;
wherein at least one of the set of compressor vanes and the set of turbine vanes comprises a set of variable vanes each vane in the set of variable vanes having a body having a leading edge and a trailing edge, a first exterior wall connecting the leading edge to the trailing edge and a second exterior wall connecting the leading edge to the trailing edge, at least one first internal cooling passage having a first inlet at a first end of the body and including at least a portion extending to the leading edge, at least one second internal cooling passage having a second inlet at a second end of the body and being connected to the leading edge of the flowpath body via a plurality of film cooling holes, and wherein the at least one first internal cooling passage is isolated from the at least one second internal cooling passage.

10. The gas turbine engine of claim 9, wherein the body has an airfoil profile and is configured to have a first angle of attack in a first position and a second angle of attack in a second position.

11. The gas turbine engine of claim 9, wherein the first end of the body is a radially outward end relative to a radius of the engine and the second end of the body is a radially inward end opposite the first end.

12. The gas turbine engine of claim 9, wherein the set of variable vanes is a subset of vanes in a single stage, and wherein the set of variable vanes are alternated with a set of fixed vanes within the stage.

13. The gas turbine engine of claim 9, wherein the first inlet is disposed within a spindle.

14. The gas turbine engine of claim 9, wherein film cooling hole outlets in the plurality of film cooling holes are perpendicular to an expected fluid flow through the gas turbine engine when each vane in the set of variable vanes is in a first orientation.

15. A method for cooling a variable vane comprising:
providing a first cooling flow to a first set of internal cooling passages from a first cooling flow inlet, the first set of internal cooling passages including at least a portion extending to the leading edge; and
providing a second cooling flow to a second set of internal cooling passages from a second cooling flow inlet, the second set of internal cooling passages being isolated from the first set of internal cooling passages and being connected to the leading edge of the flowpath body via a plurality of film cooling holes.

16. The method of claim 15, wherein providing the first cooling flow to the first set of internal cooling passages comprises providing the first cooling flow through a radially outward spindle of the variable vane, wherein providing the second cooling flow to the second set of internal cooling passages comprises providing the second cooling flow through a radially inward spindle of the variable vane, and wherein the method further includes cooling a leading edge of the variable vane and a pressure side of the variable vane using the first cooling flow and cooling a trailing edge and a suction side of the variable vane using the second cooling flow.

* * * * *